US006767615B1

(12) United States Patent
Judkins et al.

(10) Patent No.: US 6,767,615 B1
(45) Date of Patent: Jul. 27, 2004

(54) CELLULAR MATERIAL HAVING CELLS WITH SWIRLED STRANDS

(76) Inventors: Ren Judkins, 46 Newgate Rd., Pittsburgh, PA (US) 15202; John D. Rupel, P.O. Box 28581, Green Bay, WI (US) 54324-0581

( * ) Notice: Subject to any disclaimer, the term of this patent is extended or adjusted under 35 U.S.C. 154(b) by 0 days.

(21) Appl. No.: 10/405,229

(22) Filed: Apr. 2, 2003

(51) Int. Cl.[7] .......................... B32B 1/00; B32B 31/00; A47H 5/00; E06B 3/48

(52) U.S. Cl. ...................... 428/178; 428/116; 428/175; 428/188; 156/290; 156/292; 160/84.05

(58) Field of Search ............................... 428/116, 166, 428/175, 178, 188; 160/84.01, 900, 84.05; 156/196, 197, 227, 290, 292; 124/56

(56) References Cited

U.S. PATENT DOCUMENTS 4,288,485 A 9/1981 Suominen
4,388,354 A 6/1983 Suominen
4,450,027 A 5/1984 Colson
4,603,072 A 7/1986 Colson
4,673,600 A 6/1987 Anderson
4,677,012 A 6/1987 Anderson
4,677,013 A * 6/1987 Anderson .................. 428/116
4,685,986 A 8/1987 Anderson
4,732,630 A 3/1988 Schnebly
4,861,404 A 8/1989 Neff
5,193,601 A 3/1993 Corey et al.
5,228,936 A 7/1993 Goodhue
5,339,882 A 8/1994 Judkins
5,558,925 A * 9/1996 Fritzman .................. 428/181
5,690,778 A 11/1997 Swiszcz et al.
5,691,031 A 11/1997 Swiszcz et al.
5,692,550 A 12/1997 Ford et al.
5,701,940 A 12/1997 Ford et al.
6,033,504 A 3/2000 Judkins
6,068,039 A 5/2000 Judkins

* cited by examiner

*Primary Examiner*—Donald J. Loney
(74) *Attorney, Agent, or Firm*—Buchanan Ingersoll, P.C.

(57) ABSTRACT

In a material structure formed by a plurality of interconnected cells, each cell has a front section and a rear section. These sections are configured to form a V-shape or C-shape and are positioned so that the free edges are opposite one another. A section of swirled strands is connected between one free edge of the front section and one free edge of the rear section. If desired a second section of swirled strands can be connected between the second edge of the front section and the second edge of the rear section to form a closed cell. The cells are connected to one another by an adhesive. The front section and the rear section may be either a woven, non-woven or knit fabric or a film. The same fabric or different fabrics can be used for the front section and the rear section. Air guns can be used to direct the strands between the webs when the cells are being formed.

19 Claims, 3 Drawing Sheets

CELLULAR MATERIAL HAVING CELLS WITH SWIRLED STRANDS

BACKGROUND OF THE INVENTION

1. Field of the Invention

This invention relates generally to the field of cellular materials used as window coverings.

2. Description of the Prior Art

Cellular window coverings are well known in the art. These products have a series of interconnected cells usually made from fabric material. Typically, these products are made by folding and gluing sheets or strips of material to create a cellular structure or by connecting a series of webs between two parallel sheets. One advantage of using two parallel sheets is that the front of the shade can be a different material than the back of the shade.

One type of cellular window covering is made from two flat sheets of material which are pleated and then glued face to face at the apex of the folds to form the cells. Some examples of this type of cellular construction are described in U.S. Pat. No. 4,861,404 to Neff and U.S. Pat. Nos. 4,673,600, 4,677,012 and 4,685,986 to Anderson.

Another type of cellular window covering is constructed by folding over the edges of flat sheets of material and gluing the free edges to form a cell, or multi-cellular structure, and then stacking and gluing the cells on top of each other to form the cellular window covering. The cells can be cut to the width of the window in which it will be installed. Some examples of this type of cellular construction are described in U.S. Pat. Nos. 5,701,940 and 5,692,550, to Ford et al., U.S. Pat. Nos. 5,691,031 and 5,690,778 to Swiszcz et al., U.S. Pat. Nos. 4,603,072 and 4,450,027 to Colson, and U.S. Pat. No. 4,732,630 to Schnebly.

Another type of cellular window covering is produced by joining together multiple flat sheets of material along alternating glue lines between each flat sheet. Several sheets of material can be joined this way to form multiple honeycomb shaped rows of cells or a row of cells can be cut at a bond line if a single row of cells is desired. The cells can then be cut to the width of the window in which it will be installed. Some examples of this type of cellular construction are described in U.S. Pat. Nos. 4,388,354 and 4,288,485 to Suominen and U.S. Pat. No. 5,228,936 to Goodhue.

Another method of producing a cellular window covering is disclosed in U.S. Pat. No. 5,193,601, to Corey, et al., in which a multi-cellular collapsible window covering is made from a continuous sheet of flexible material. The sheet of flexible material is pleated in a manner to create permanent folds in the material at regular intervals in alternating directions so that the material collapses easily into a compact stack. Bonds between adjacent folds in the pleated material are formed either by welding or adhesive or other bonding agents along lines parallel to and equidistant from both sides of the pleats.

Judkins in U.S. Pat. No. 5,339,882, discloses a window covering having a series of slats connected between two spaced apart sheets of material. The slats are substantially perpendicular to the sheets of material and connected to the sheets by flexible strands. Related U.S. Pat. Nos. 6,068,039 and 6,033,504 teach that the spaced apart sheets may be translucent materials and the webs or slats placed on the webs may be opaque. The slats are substantially parallel to the first and second sheets of material when the window covering is in a closed position.

In U.S. Pat. No. 5,753,338 relic et al. disclose a honeycomb material for window coverings in which the front face, rear face and slats are interwoven simultaneously. This process uses an improved warp knitting technique in which a front mesh and a rear mesh are provided and warp threads are woven through them. The two meshes are maintained parallel to one another. At selected intervals slats are woven between the two meshes to form a honeycomb structure. This window covering has not been commercialized.

The use of flexible strands for the web portion of cellular shades provides the advantage that lift cords can be easily threaded through the cells. Yet, all of the cellular materials that contain webs formed of flexible strands or threads have a front sheet and a back sheet that extend the full length of the shade. Prior to the present invention there were no cellular structures in which individual cells were made of distinct pieces of fabric connected by strands.

SUMMARY OF THE INVENTION

We provide a cellular material in which a plurality of interconnected cells each have a front section and a rear section. These sections are configured to form a V-shape or C-shape and are positioned so that the free edges are opposite one another. A section of swirled strands is connected between one free edge of the front section and one free edge of the rear section. If desired a second section of swirled strands can be connected between the second edge of the front section and the second edge of the rear section to form a closed cell. The cells are connected to one another by a pair of glue beads adjacent or on top of the section of swirled strands. In one embodiment the glue beads are positioned such that one glue bead bonds the first edge of a front section of one cell to the second edge of the front section of an adjacent cell and the second glue bead bonds the first edge of the rear section of that one cell to the second edge of the rear section of the adjacent cell. The front section and the rear section may employ woven, non-woven, knit fabrics and/or film substrates. The same fabric or different fabrics can be used for the front section and the rear section.

The front section and the rear section can be made of transparent or translucent fabrics and a slat of opaque material can be placed within each cell resting on a section of swirled strands. When the front sections of the cells are moved relative to the rear section of the cells, the opaque slats are tilled from a horizontal position toward a vertical position blocking the passage of light through the cellular structure.

The front section and rear section can be of equal size to create a symmetrical cell or they may be of different sizes to create a D-shaped or other non-symmetrical cell. Furthermore, the front section and rear section may have permanent pleats or soft folds that will fall out giving the structure a Roman shade-like appearance.

The cellular structure can be made on machinery that fully automates the production process. In this machinery two strips of fabric from separate rolls are folded and aligned edge to edge with a cord space between the aligned edges. Then swirled strands are applied between them using air jets to carefully control their position.

Other objects and advantages of the invention will become apparent from a description of certain present preferred embodiments thereof shown in the drawings.

DETAILED DESCRIPTION OF THE PREFERRED EMBODIMENTS

Figures 1, 2:
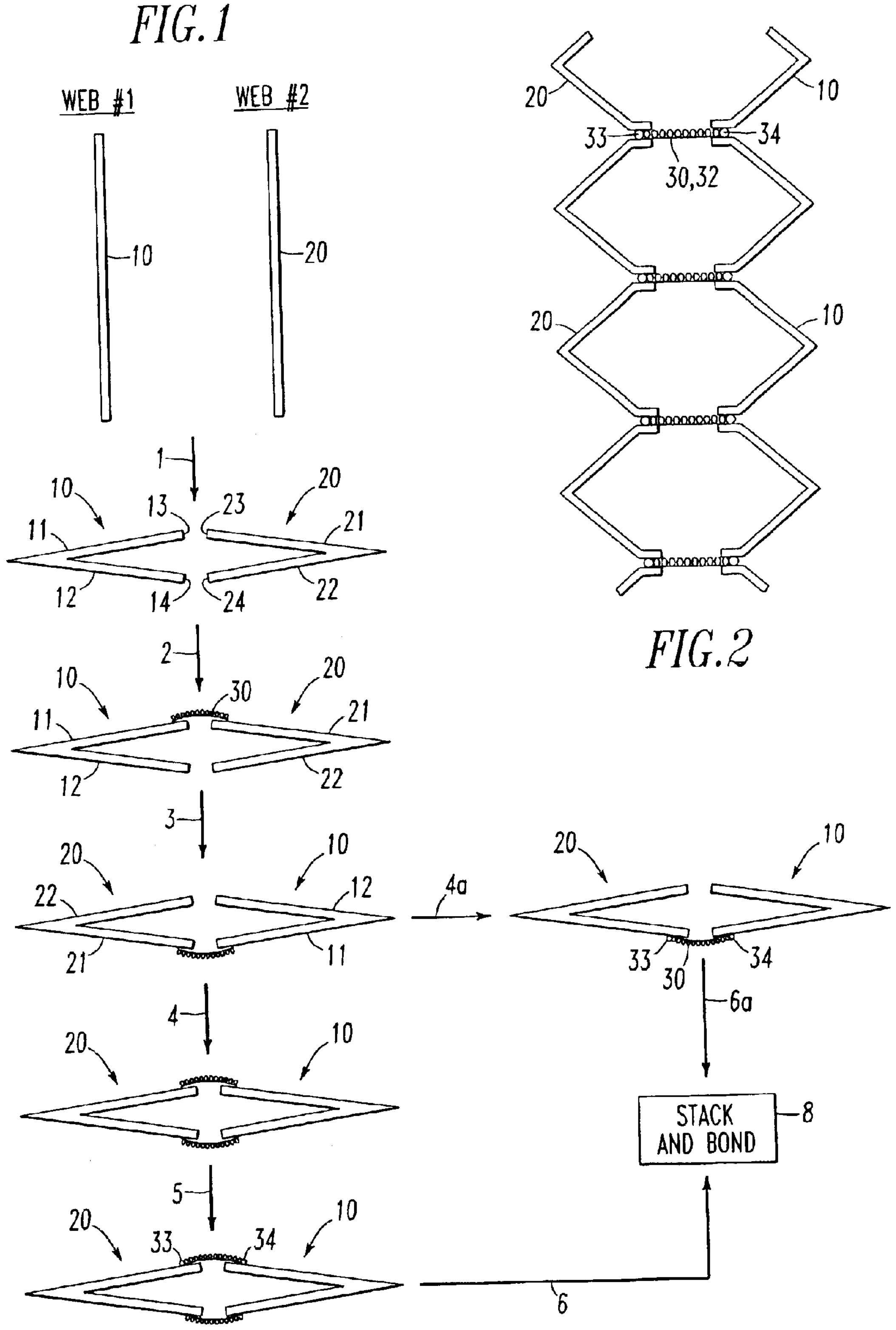
FIG. 1 is a diagram illustrating how the cells of the present cellular structure are formed.
FIG. 2 is a side elevational view of a portion of a present preferred cellular structure in the open position.
Figure 3:
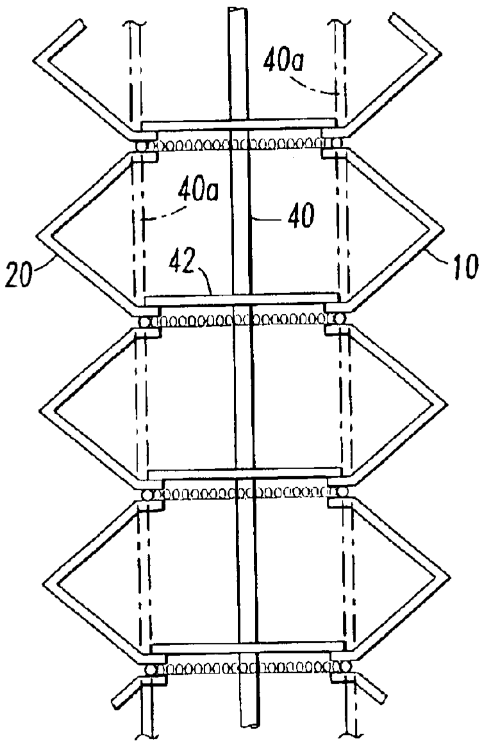
FIG. 3 is a side view of a portion of a second preferred embodiment of our cellular material in which a center lift cord, or alternatively pairs of lift cords shown in chain line, pass through the structure.
Figure 4:
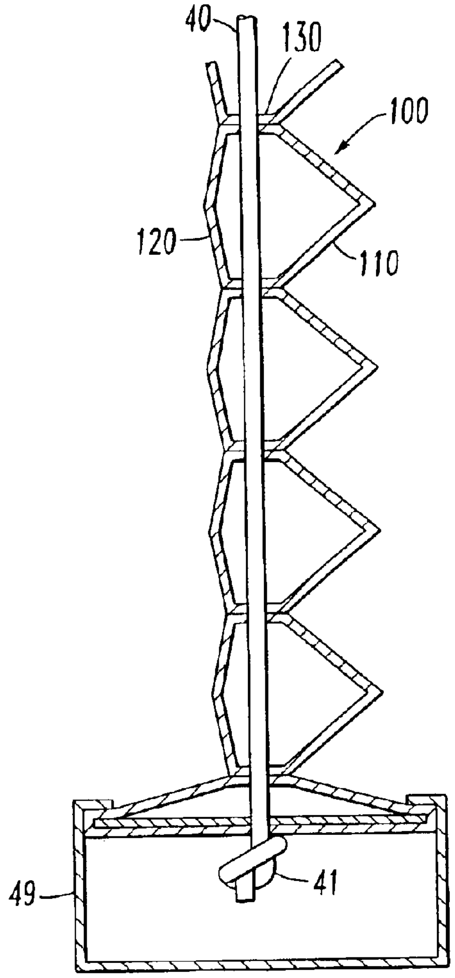
FIG. 4 is a side view of a portion of a third preferred embodiment of our cellular material with a center lift cord passing through the structure.

Each cell of the present cellular structure is formed from two elongated strips or webs that are curved or folded and joined edge to edge by swirled strands. Referring to FIG. 1 there is shown an end view of two strips of material 10 and 20 labeled WEB #1 and WEB #2. The material may be any woven or non-woven fabric suitable for use as a window covering. There may also be some films that could be made into cellular structures in accordance with the present invention. As indicated by arrow number 1, each web 10 and 20 is folded into a V shape creating an upper wall 11 and 21 and a lower wall 12 and 22. The V-shape may be formed by impressing a permanent pleat in the fabric. Alternatively, the web could be C-shaped and have no pleat or the pleat could be soft allowing the fold to fall out while the cellular structure is hung from a headrail. This structure would thus have a Roman shade-like appearance. The webs 10 and 20 are positioned so that the edges 13 and 23 of the upper walls 11 and 21 are opposite one another. Similarly, the edges 14 and 24 of the lower walls 12 and 22 are opposite one another. When so positioned the edges 13 and 14 or 23 and 24 are in a plane that does not pass through any other portion of the web. That plane should be normal to a plane passing through the folds or pleats in the webs, but those planes could meet at an angle less than 90°. Next a series of swirled strands 30 below arrow 2 are applied between the edges 13 and 23 of the upper wall. The gap between edges 13 and 23 across which the strands 30 are placed is preferably wide enough such that at least one lift cord 40 may be disposed through corresponding spaces between the strands 30. Preferably, the gap is not greater than one-fourth inch. This can be seen in the embodiments shown in FIG. 4. In the embodiment of FIG. 3, the gap is very large and slats 42 are placed on the swirled strands between the two webs 10 and 20. A lift cord 40 may pass through slots in the center of the slat or pairs of lift cords 40*a* could pass through slots cut in the edges of the slats. The number of lift cords will vary according to the width of the shade. The strands 30 may be applied through a heated reservoir so that the strands 30 are applied in a liquid or tacky solid state. The adhesive remains in this form until after it contacts the surface of the web. Being liquid or tacky, the adhesive will adhere to each surface it contacts. It is also possible to make the surface of the web which receives the strands reactive or tacky by applying a reactive material or a tacky material to that surface before applying the strands. If that surface is tacky or reactive then the strands need not be tacky. The strands 30 are placed upon and travel back and forth between the upper surfaces 11 and 21 of the webs 10 and 20 adhering to each. As a result, a plurality of strands 30 of flexible adhesive connects the webs of material 10 and 20 much like a spider web. The strands may or may not intersect. We prefer that the distance between any two adjacent stands be not more than one-eighth inch. The number of strands applied, their position and their thickness determine the thickness and density of the bridge of strands between the webs. There are now available air guns that can be used in combination with the adhesive feeder that forms the strands. These air guns enable a manufacturer to very accurately control the placement of the strands. The material used for the strands and the orifice in the extruder that forms the strands will determine the size of the strands.

After the bridge of swirled strands 30 has been applied the structure is flipped as indicated by arrow 3. The remaining steps follow arrows 4, 5 and 6 or 4*a* and 6*a*. In one process a second bridge of swirled strands 32 is applied between surfaces 12 and 22 of webs 10 and 20 forming a closed cell. The cells are joined together by an adhesive. The adhesive is applied in two beads 33 and 34 on the surfaces of the webs 10 and 20. The beads 33 and 34 are adjacent the bridge of swirled strands 30. Preferably, these beads extend over the swirled strands and help bond the strands 30 to the webs 10 and 20. Finally, the cells are stacked and bond together in the stack to form a cellular structure similar to that shown in FIG. 2.

An optional method indicated by arrows 4*a* and 6*a* applies only one bridge of swirled strands 30 and two beads of adhesive 33 and 34. Then this open cell structure is stacked and bonded as indicated at box 8. The only difference between the cellular structures formed by the two methods illustrated in FIG. 1 is that one structure will have a single bridge of swirled strands at the interface of adjacent cells and the second structure will have two bridges of swirled strands at that interface.

The webs 10 and 20 can be made of the same material or be different materials. The materials may differ in cost, opacity, thickness, method of manufacture, texture or in the way in which the material diffuses light. In the embodiment shown in FIG. 3 the first web 10 and the second web 20 are made of a transparent material that does not act as a barrier to heat or light. A slat 42 of opaque material is placed within each cell and rests on the swirled strands. The cellular structure is attached between a headrail and a bottomrail (not shown). The cellular structure can be tilted so that the webs 10 and 20 move relative to one another causing the slat 42 to move toward a vertical position blocking passage of light through the cells. The elongated slats are placed in each cell and not connected to the first and second webs 10 and 20 or to the swirled strands. The lift cords 40 or 40*a* hold the slats in place. One could also use narrower slats that did not overlap one or both of the webs. These slats could be connected to the swirled strands by any convenient means such as through adhesives. If the slat overlapped one of the webs, the slat could be attached to that web. A single edge of the slat could be connected using a hinge connection. The hinge connection could be biased toward a closed position. Use of narrower slats may be preferable for structures that are collected on a roller and have no lift cords. The elongated slats 42 are preferably made of a thermally insulating, nontransparent material such as polypropylene film or tightly woven polyester. The slats 42 may be a lengths of fabric or plastic material which are fed onto the swirled stands shortly after they are applied to the webs.

A window covering having the structure shown in FIG. 3, operates much like a venetian blind. By manipulating the position of the first web portions 10 and the second web portions 20 relative to one another, the window covering structure may be placed in an open position as shown in FIG.

3 or a closed position. In the open position, the thin edges of each elongated slat 42 are directed towards the front and rear of the structure. Those edges are sufficiently thin so that they do not substantially obstruct heat and light from passing between the front and rear of the structure. In the closed position, the slat face surfaces are generally parallel with the front and rear of the structure and overlap. Thus, a barrier is formed by the elongated slats 42 when the structure is in the closed position, preventing heat and light from passing to and from the front and rear of the structure 10.

For the window covering to be in either the open or closed position, the structure must be extended as is shown in FIG. 3. However, it is often desirable to have the structure moved sufficiently out of the way of the window it is covering. In this instance, the structure may be stacked or collected on a roller. When the structure is placed in the stacked position, the webs 10 and 20 are flattened and are placed in close proximity to one another. When this flattening of the structure occurs, elongated slats 42 are necessarily brought within close proximity to one another.

The cells in the embodiments of FIGS. 2 and 3 are symmetrical. However, non-symmetrical cells can also be made as in the embodiment shown in FIG. 4. The cells 100 in that embodiment are D-shaped with the front webs 110 being larger than the rear webs 120. This cellular structure is shown as being attached to a bottomrail 49. The lift cord 40 is retained in the bottomrail by a knot 41. The lift cord 40 is disposed through holes formed by spaced apart swirled strands.

Although the cellular structure is illustrated with the cells oriented horizontally, the cellular structure could be used with the cells oriented vertically. In that event the structure may travel on a track or traverse rod rather than be operated by lift cords or wound on a roller.

Figure 5:
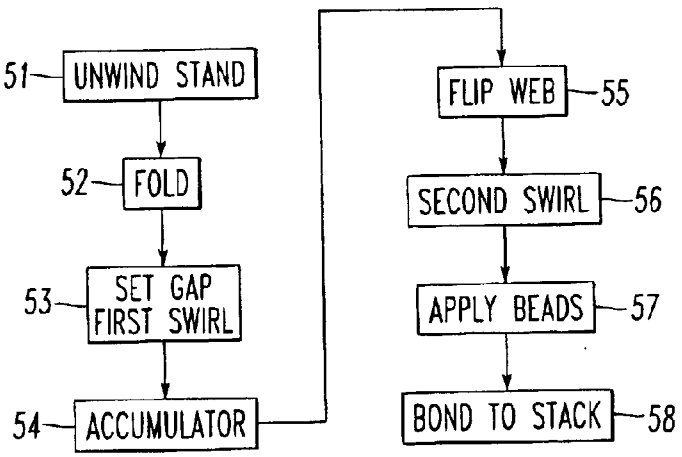
FIG. 5 is a block diagram of a present preferred method for forming the cellular structure of the present invention.
Figure 6:
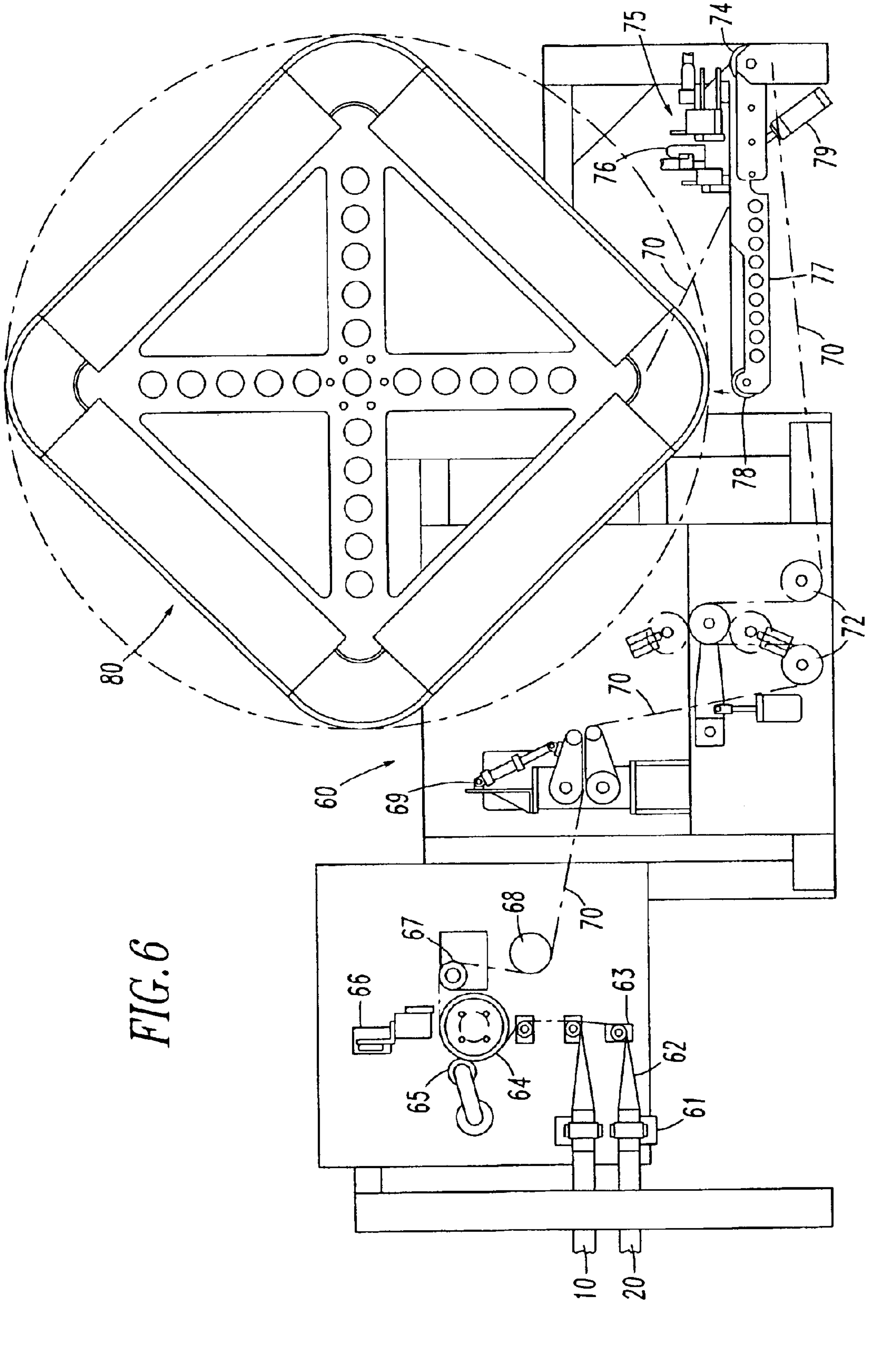
FIG. 6 is a side view of a present preferred apparatus for making the cellular structure.

The cellular structure here disclosed can be made in a fully automated process using the steps shown in FIG. 5 and a machine like that shown in FIG. 6. The material from which the front section and the rear section are made are rolls of selected fabric mounted on a stand (not shown). The first step indicated by box 51 in FIG. 5 is to unwind the fabric and direct it to the fabricating machine 60 shown in FIG. 6. As the webs enter the machine 60 they pass over an idler wheel 61 and into a V-shaped guide 62. As the web passes through this guide it is folded as indicated by box 52 in FIG. 5. The folded webs each pass between rollers 63 that may be heated to form a pleat. When the webs reach mandrel 64 they are oriented to have their free edges opposite one another as shown below arrow 1 in FIG. 1. There may be some variation in the width of the upper and lower surfaces of the webs as they enter the drum 64. Therefore, we prefer to provide a slitter 65 adjacent the mandrel 64 to trim the webs as they pass. This assures that the webs are always the same size. The slitter also assures that the gap between the two webs 10 and 20 remains constant. There is a strand making assembly 66 that creates and applies the strands between the exposed surfaces of the webs 10 and 20. A pull conveyor assembly 69 is located before and after the strand making assembly 69. This portion of the process is indicated by box 53 in FIG. 5. The webs are pulled over rollers 67 and 68 by the first pull conveyor assembly. Then the webs pass through the strand making assembly 66 and over the second pull conveyor assembly. The webs are fed through the machine in a manner so as to be under a very minimum amount of tension when the strands are applied. As the material leaves the second pull conveyor the structure would look like what is shown below arrow 2 in FIG. 1. The rollers 63 are preferably load-sensing rollers and provide closed-loop feedback to the two pull conveyors for controlling the lack of web tension between them. The path of the webs from wheel 68 to the turret 80 on which it is stacked is indicted by broken line 70. The connected webs then travel through a series of accumulator rolls 72 indicated by box 54 in FIG. 5. The connected webs are flipped to accomplish step 55 in FIG. 5 by being passed around wheel 74. Then a second strand making assembly 75 creates and applies swirled strands between the opposite surfaces of the webs 10 and 20 that were exposed when the structure was flipped. This is step 56 in FIG. 5. At this point the material would look like the structure shown in FIG. 1 below arrow 4. The next step, indicated by box 57 in FIG. 5, is to apply glue beads adjacent the bridge of swirled strands. A glue system 76 applies the glue beads immediately after the second bridge of swirled strands is applied. Now the structure looks like that shown in FIG. 1 below arrow 5. Finally, the webs with glue beads are wrapped around the revolving turret 80. Because there are two glue beads on the material being wound on the web, that material bonds to the material on the turret to form a cellular structure similar to that shown in FIG. 2. This is the last step 58 in the diagram of FIG. 5. We prefer to provide an arm 77 that has a wheel 78 at one end. The opposite end is pivotably connected to the frame of the stand holding turret 80. Hydraulic cylinder 79 raises the end of arm 77 so that wheel 78 rests on the connected webs as they go onto the turret 80. The wheel acts as a guide and applies pressure to the webs. The pressure assures that a strong bond will be formed by adhesive beads 33 and 34. When a desired amount of material has been wrapped around the turret, the machine is stopped. Then the stack is cut to remove the curved section at each comer leaving four stacks of cellular product.

The strands 30 may be formed and connected to opposed sections of material by any convenient means. In a preferred dispenser such as elements 66 and 75 in FIG. 6, a curable liquid or thermoplastic is dispensed as a continuous strand. The dispenser has a holding area or well within which the curable liquid is held. There is an opening through which the liquid may be dispensed. Although pressure is applied to dispense the liquid, the opening is preferably located on the bottom of the well so that gravity will assist in causing the curable liquid to exit. One or more air guns direct the strand from the well to the surfaces of the webs 10 and 20. Using air guns permits the manufacturer to control the structure of the web assuring desired spacing between adjacent strands. Preferably, the strand forms a series of overlapping swirls as it is applied to the webs. The curable liquid contacts the webs and bonds to the surfaces of the webs that it contacts. As the liquid is being drawn into a strand, it is being solidified or cured through contact with the ambient air. The air may be cooled or contain catalysts.

Any number of strands may be provided to connect two sections of material. Furthermore, the strands may be at any selected distance apart. The number of strands per inch depends upon a number of considerations, such as production time and the number of swirl guns (the more strands that are used, the longer the structure will take to manufacture unless more swirl guns are used), the appearance of the final product (fewer strands look weaker), and strength (the greater the number of strands, the stronger will be the bond between the two webs of material). In one present preferred embodiment the width of the swirl pattern is ¼ inch (7 mm.) and the opening between adjacent strands is about ⅛ inch (3.5 mm.). That opening should be large enough so that a lift cord can easily pass through the opening. But this is not necessary if the smaller strands are used because those strands could be cut by the cord as it is threaded through the structure. The thickness of each strand may be selectable by increasing or decreasing the opening of the orifice through which the material forming the stands is delivered. This thickness will also depend upon the material chosen, the viscosity of the liquid in the well, and the rate of travel of the strand between the webs. Each strand may be as long or short as is desired. The entire web may be formed of one continuous strand or contain several stands.

The strands may be formed of any suitable material which can be applied in a generally liquid form, strung in a strand and cured, preferably through contact with ambient environment, to a solid flexible strand. Suitable materials include polyester based adhesives such as the type which may be cured through cooling. In the case of a polyester curable by cooling, the well of the applicator may contain a heating unit or the liquid should be otherwise heated so as to be in a liquid state. Other suitable materials to be used as the strand material include polyurethane such as the type which is cured through contact with moisture. In this case, the well of the applicator should maintain a relatively moisture free environment so that the strand material is in a relatively liquid state and may flow freely out of the well. Contact with the ambient air will cool and solidify the strand and contact with the moisture in the air over time would cause the polyurethane to cure and cross-link for additional strength.

With the about mentioned strand materials as well as others, the viscosity of the liquid may be so that when considered in cooperation with the size of the opening a desired flow rate adhesive out of well can be achieved. For example, in the case of polyester cured by cooling, the higher the temperature maintained in the well, the less viscous is the adhesive within the well and the more freely the adhesive will flow out of well.

While certain present preferred embodiments have been shown and described, it is distinctly understood that the invention is not limited thereto but may be otherwise embodied within the scope of the following claim.

We claim:

1. A material structure comprising a plurality of interconnected cells each cell comprising:

a front section having a first free edge and a second free edge, the front section configured to form a V-shape or C-shape in which the free edges are opposite one another;

a rear section having a first free edge and a second free edge, the rear section configured to form a V-shape or C-shape in which the free edges are opposite one another; and a section of swirled strands connected between the first edge of the front section and the first edge of the rear section;

wherein the cells are connected to one another by a pair of glue beads such that one glue bead bonds the first edge of a front section of one cell to the second edge of the front section of an adjacent cell and the second glue bead bonds the first section of the first edge of the rear section of that one cell to the second edge of the rear section of the adjacent cell.

2. The material structure of claim 1 also comprising a second section of swirled material in at least one of the cells, the second section of the swirled material connected between the second edge of the front section and the second edge of the rear section.

3. The material structure of claim 1 wherein the front section and the rear section are a material selected from the group consisting of woven fabrics, non-woven fabrics, knit fabrics and films.

4. The material structure of claim 3 wherein the front section and the rear section are different materials.

5. The material structure of claim 4 wherein the front section is a woven fabric and the rear section is a non-woven fabric.

6. The material structure of claim 1 wherein all cells are symmetrical.

7. The material structure of claim 1 wherein all cells are non-symmetrical.

8. The material structure of claim 1 wherein the strands are polyester or polyurethane.

9. The material structure of claim 1 wherein the edges of the front section are spaced apart from the edges of the rear section in each cell by a distance not greater than ¼ inch.

10. The material structure of claim 1 wherein adjacent strands are spaced apart a distance not greater than ⅛ inch.

11. A method of forming a cellular structure comprising:

providing a pair of webs, each web having a first elongated side and a second elongated side and configured so that the two elongated sides of that web are in a common plane that does not pass through any portion of that web except the elongated sides;

orienting the webs so that the first elongated side of one web is adjacent to and spaced apart from the first elongated side of the second web and the second elongated side of the first web is adjacent to and spaced apart from the second elongated side of the second web; and directing with at least one air gun at least one strand of a material between the first elongated edge of the first web and the first elongated edge of the second web, so that the material will adhere to the webs.

12. The method of claim 11 also comprising directing with at least one air gun at least one second strand of a material between the second elongated edge of the first web and the second elongated edge of the second web, the so that when a plurality of webs are stacked the material will adhere to the webs, such that the webs and strands from a cellular structure.

13. The method of claim 11 also comprising repeating the steps of claim 11 to form additional cellular structures, stacking those cellular structures and bonding each cellular structure to another cellular structure to create a multicellular structure.

14. The method of claim 11 also comprising pleating the webs before applying the strands to create a single pleat in each web.

15. The method of claim 11 wherein there is a second plane passing through the pleats of the pair of webs and the planes through the elongated edges of the webs are normal to the second plane.

16. The method of claim 11 wherein the strands are a flexible adhesive material.

17. The method of claim 11 also comprising placing a bead of adhesive over a portion of the strands that lies on a web.

18. A method of forming a cellular structure comprising:

providing a first pair of webs, each web having a first elongated side and a second elongated side and configured so that the two elongated sides of that web are in a common plane that does not pass through any portion of that web except the elongated sides;

orienting the webs so that the first elongated side of one web is adjacent to and spaced apart from the first elongated side of the second web and the second elongated side of the first web is adjacent to and spaced apart from the second elongated side of the second web;

directing with at least one air gun at least one strand of a material, between the first elongated edge of the first web and the first elongated edge of the second web, so that the material will adhere to the webs;

providing a second pair of webs, each web having a first elongated side and a second elongated side and configured so that the two elongated sides of that web are in the common plane and the common plane does not pass through any portion of that web except the elongated sides;

orienting the webs of the second pair of webs so that the first elongated side of one web is adjacent to and spaced apart from the first elongated side of the second web and the second elongated side of the first web is adjacent to and spaced apart from the second elongated side of the second web;

directing with at least one air gun at least one strand of a material, the material between the first elongated edge of the one web of the second pair of webs and the first elongated edge of the other web of the second pair of webs, so that the material will adhere to the webs; and bonding the first pair of webs to the second pair of webs to create a cellular.

19. The method of claim 18 comprising repeating the steps of claim 18 to form and bond together additional pair of webs and strands to create a multi-cellular structure.

* * * * *

UNITED STATES PATENT AND TRADEMARK OFFICE

CERTIFICATE OF CORRECTION

PATENT NO. : 6,767,615 B1 Page 1 of 1
DATED : July 27, 2004
INVENTOR(S) : Ren Judkins and John D. Rupel It is certified that error appears in the above-identified patent and that said Letters Patent is hereby corrected as shown below:

Column 8,
Line 39, delete the second occurrence of "the".
Line 41, change "from" to -- form --.

Column 10,
Line 11, after "cellular" insert -- structure --.
Line 13, change "pair" to -- pairs --.

Signed and Sealed this

Thirtieth Day of November, 2004

JON W. DUDAS
*Director of the United States Patent and Trademark Office*